(12) United States Patent
Balsiger

(10) Patent No.: US 9,371,899 B2
(45) Date of Patent: Jun. 21, 2016

(54) HARMONIC DRIVE ASSEMBLY WITH SELECTIVE DISCONNECT AND RECONNECT

(71) Applicant: HAMILTON SUNDSTRAND CORPORATION, Windsor Locks, CT (US)

(72) Inventor: Derick Balsiger, Mayer, AZ (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 63 days.

(21) Appl. No.: 14/287,928

(22) Filed: May 27, 2014

(65) Prior Publication Data

US 2015/0345606 A1    Dec. 3, 2015

(51) Int. Cl.
  *F16H 35/00* (2006.01)
  *F16H 49/00* (2006.01)
(52) U.S. Cl.
  CPC ........ *F16H 49/001* (2013.01); *F16H 2049/003* (2013.01); *Y10T 74/19614* (2015.01)
(58) Field of Classification Search
  CPC .................................................... F16H 49/001
  USPC .......................................................... 74/640
  See application file for complete search history.

(56) References Cited

U.S. PATENT DOCUMENTS

| | | | | |
|---|---|---|---|---|
| 7,891,272 B2* | 2/2011 | Schonlau | ............... | B25J 9/1025 74/640 |
| 8,104,375 B2* | 1/2012 | Kassler | .................. | B60K 17/20 74/640 |
| 8,733,207 B2* | 5/2014 | Doi | ........................ | B25J 9/1025 74/490.03 |
| 9,021,919 B2* | 5/2015 | Takahashi | ............. | F16H 49/001 74/640 |
| 2013/0074636 A1* | 3/2013 | Doi | ........................ | B25J 9/1025 74/490.03 |

* cited by examiner

*Primary Examiner* — Ha D Ho
(74) *Attorney, Agent, or Firm* — Cantor Colburn LLP

(57) ABSTRACT

A selectively disconnectable and reconnectable harmonic drive assembly of a rotary actuator is provided. The drive assembly includes a harmonic wave generator configured to rotate and disconnect and reconnect a harmonic drive of the actuator by moving radially inward to allow the disconnect of a flex spline from a ring gear and radially outward to allow the reconnect of the flex spline to the ring gear. With respect to the disconnect, roller bearings and a disconnect spring are configured to push the wave generator axially when a solenoid is activated, allowing the roller bearings to move radially inward. This movement releases an outward force on the flex spline, disconnecting the flex spline from the ring gear. The solenoid is deactivated so that a ball-lock sleeve is forced axially by a ball-lock-sleeve-return spring, and ball bearings are forced radially into a groove in a locked "disconnect" position.

13 Claims, 3 Drawing Sheets

HARMONIC DRIVE ASSEMBLY WITH SELECTIVE DISCONNECT AND RECONNECT

BACKGROUND OF INVENTION

This invention relates, generally, to an actuation system for an aircraft and, more specifically, a harmonic drive assembly of a rotary actuator with selective disconnect and reconnect.

Harmonic drive can reduce backlash in a motion-control system. More specifically, a harmonic gear allows high reduction ratios with concentric shafts and relatively low backlash and vibration. The harmonic gear is based upon a relatively simple construction using elasto-mechanical properties of metal.

The harmonic gear is constructed generally of a wave generator, flex spline, and ring gear. The wave generator is an oval or elliptical cam with a thin ball bearing placed around an outer circumference of the cam. The wave generator is mounted onto a shaft of a motor. The flex spline is thin and made of elastic metal with external teeth formed along an outer circumference of the flex spline. The ring gear is a rigid internal gear with internal teeth formed along an inner circumference of the ring gear. The internal teeth are of a same size as the external teeth of the flex spline, but the ring gear has more internal teeth than the flex spline has external teeth. The ring gear is attached to a gearbox along an outer circumference of the ring gear. The wave generator, flex spline, and ring gear are co-axially aligned with respect to each other.

In operation, the wave generator is mounted on a drive shaft, and, as the wave generator is rotated, it imparts a continuously moving elliptical form or wave-like motion to the flex spline. This causes meshing of the external teeth of the flex spline with the internal teeth of the ring gear at respective equidistant points of engagement or connection thereof to progress in a continuously rolling fashion. It also allows for full-teeth axial disengagement or disconnection at the points opposite a minor axis of the wave generator. A major axis of the flex spline actually rotates with the wave generator, so the points where the corresponding teeth mesh with each other revolve around a center point at a rate equal to that of the wave generator.

Since the flex spline has fewer external teeth than the ring gear has internal teeth and the full-teeth axial disconnect is made possible by the ellipticity of the wave generator, each complete revolution of the wave generator causes a circumferential displacement of the flex spline in relation to the ring gear. This displacement is always in a direction opposite to that of the rotation of the wave generator (i.e., if the wave generator is rotating in a clockwise direction, the displacement of the flex spline is in a counterclockwise direction and vice versa). In this way, the harmonic drive is capable of functioning as a speed reducer.

In an aircraft system, for example, a rotary electromechanical actuator (rotary EMA) is implemented mainly for so-called "secondary flight controls" (such as ailerons, flaps, slats, and spoiler and other flight-control surfaces). In this context, the harmonic drive is incorporated with the rotary EMA. When the rotary EMA fails, it can lock up a surface that it is configured to actuate. Upon such failure, it is desired to freely or selectively disconnect the rotary EMA and then reconnect the disconnected rotary EMA. However, axial movement of the wave generator out of the flex spline can render such reconnect difficult. As such, it is desirable to more easily reconnect the disconnected rotary EMA.

BRIEF DESCRIPTION OF INVENTION

According to a non-limiting embodiment of the invention, a drive assembly of a rotary actuator with selective disconnect and reconnect is provided. The drive assembly includes an application-specific harmonic wave generator that is configured to rotate and disconnect and reconnect a harmonic drive of the actuator. Toward that end, the wave generator is configured to move radially inward to allow the disconnect of a flex spline from a ring gear while remaining within the flex spline and radially outward to allow the reconnect of the flex spline to the ring gear.

More specifically, the drive assembly includes also a solenoid, a ball-lock sleeve, a ball-lock-sleeve-return spring, lock ball bearings, a rotational axis, tapered roller bearings, and a disconnect spring. With respect to the disconnect, the roller bearings and disconnect spring are configured to push the wave generator axially when the solenoid is activated, allowing the roller bearings to move radially inward. This movement releases an outward force on the flex spline, disconnecting the flex spline from the ring gear. The solenoid is deactivated so that the ball-lock sleeve is forced axially by the ball-lock-sleeve-return spring, and the ball bearings are forced radially into a groove in a locked "disconnect" position.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

Referring now to the figures, a non-limiting embodiment of a drive assembly and, thus, rotary actuator according to the invention is shown at 10. Although the actuator 10 is disclosed herein as electromechanical (a rotary EMA actuator 10), it should be appreciated that the actuator 10 can be any suitable type of actuator. Furthermore, although the actuator 10 is so disclosed as being implemented for secondary flight controls of an aircraft system, it should be appreciated also that the actuator 10 can be implemented for any suitable motion control of such system. In addition, although the actuator 10 is so disclosed as being employed in connection with aircraft systems, it should be appreciated also that the actuator 10 can be employed in connection with any suitable system.

Figure 1:
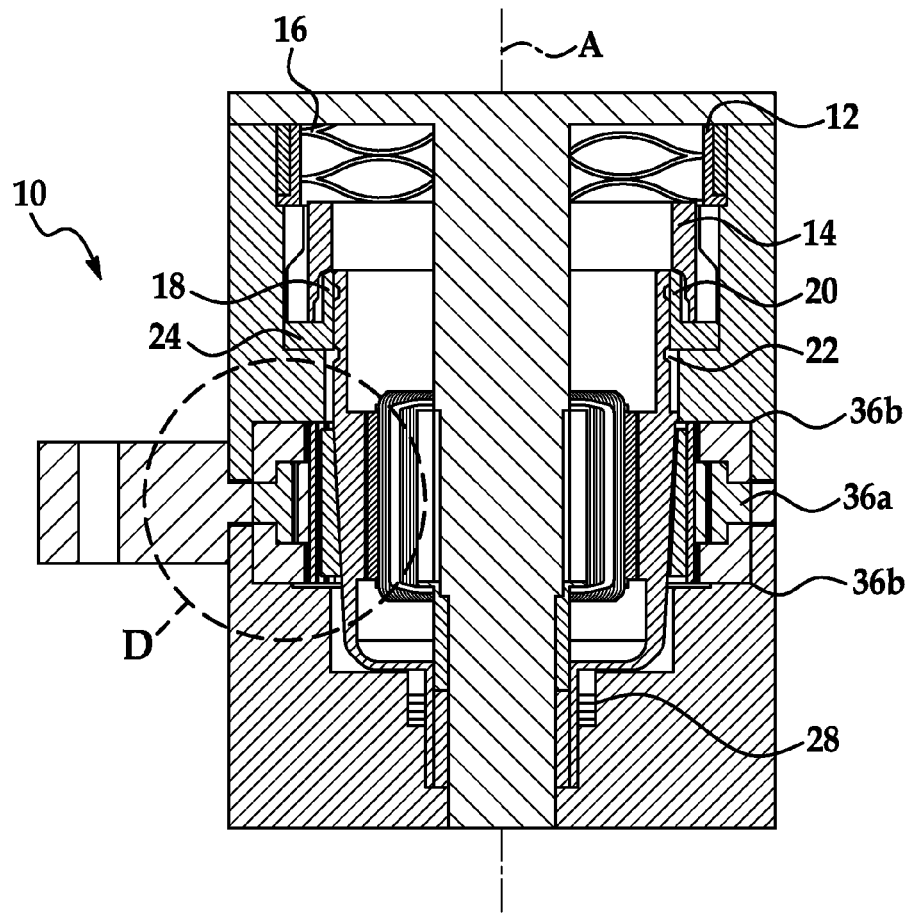
FIG. 1 is a sectional view of a non-limiting embodiment of a drive assembly of a rotary actuator with selective disconnect and reconnect according to the invention showing the drive assembly in a "connected" state.

Referring specifically to FIG. 1, the actuator 10 includes a solenoid 12, a ball-lock sleeve 14, a ball-lock-sleeve-return spring 16, and lock ball bearings 18. The solenoid 12 is configured to receive "Connect" and "Disconnect" commands (which are the same command to the solenoid 12). The ball-lock sleeve 14 is in operative communication with the solenoid 12. The ball bearings 18 are configured to move radially inward (to the right in FIG. 1) and radially outward (to the left in FIG. 1) into a primary groove 20 in a "connect" position or secondary groove 22 in a locked "disconnect" position. The ball bearings 18 are retained in a lock-ball-bearing retainer 24. The solenoid 12 pulls the ball-lock sleeve 14 and unlocks the ball bearings 18. The solenoid 12 is then de-energized, and the ball-lock-sleeve-return spring 16 locks the ball bearings 18 in either the "disconnect" or "connect" position. FIG. 1 shows the drive assembly 10 in a "connected" state.

More specifically, the solenoid 12 is configured to receive the "Disconnect" command to be activated to pull the ball-lock sleeve 14 axially along a rotational axis "A" away from a harmonic drive and toward the solenoid 12 (upward in FIG. 1). The solenoid 12 is configured to receive also the "Connect" command to be activated to again pull the ball-lock sleeve 14 along the rotational axis "A" away from the harmonic drive and toward the solenoid 12 (downward in FIG. 1). Toward this end, the ball-lock-sleeve-return spring 16 is configured to force the ball-lock sleeve 14 axially away from the solenoid 12 (downward in FIG. 1). It should be appreciated that the solenoid 12 can receive the "Disconnect" command and be activated and deactivated by any manner generally known in the related art.

The actuator 10 includes also roller bearings 26 (FIG. 2) and a disconnect spring 28. Each roller bearing 26 is tapered, and (as described below) a load can be generated at the roller bearing 26, such load defining axial and radial components. The disconnect spring 28 is configured to apply a force, which can be aided by the axial component of the load at the roller bearing 26.

Figure 2:
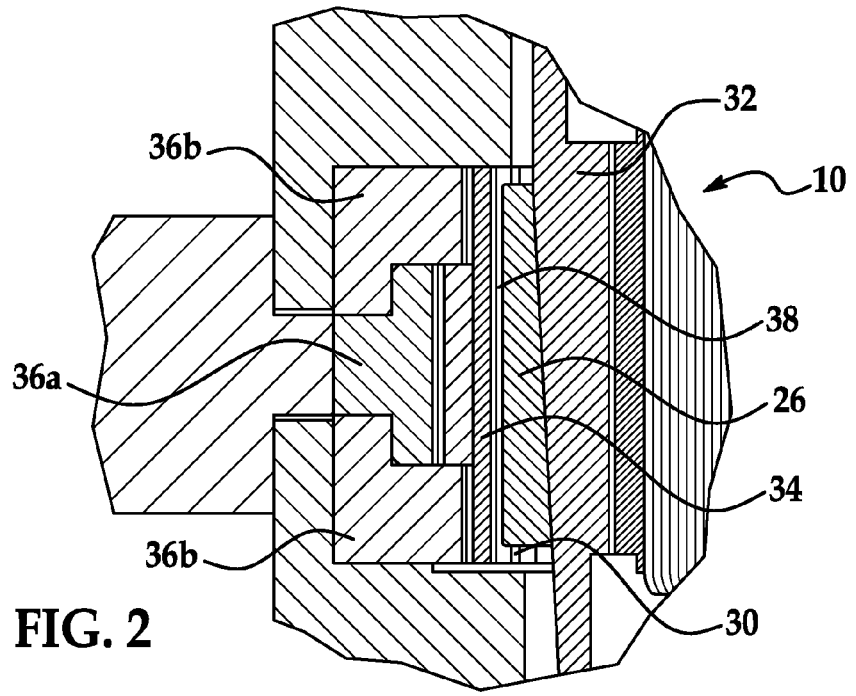
FIG. 2 is a detailed view showing Section "D" illustrated in FIG. 1 of the non-limiting embodiment of the drive assembly of the rotary actuator with selective disconnect and reconnect according to the invention.

Referring specifically to FIG. 2, the actuator 10 includes also a roller-bearing separator 30 and an application-specific harmonic wave generator 32. The roller-bearing separator 30 separates the roller bearing 26. The wave generator 32 is configured to rotate about the rotational axis "A," operatively contacts the roller bearing 26, and defines an axial length of the wave generator 32. This axial length is such that operative contact between the wave generator 32 and roller bearing 26 is always maintained. The wave generator 32 is also tapered and configured to move with respect to the taper—i.e., axially toward and away from the solenoid 12 (upward and downward, respectively, in FIG. 1). As such, a radial size of the wave generator 32 decreases as the wave generator 32 moves axially toward the solenoid 12 and increases as the wave generator 32 moves axially away from the solenoid 12. In this way, the roller bearing 26 is configured to move radially inward (to the right in FIG. 2) and radially outward (to the left in FIG. 2), respectively. Also, the axial component of the load at the roller bearing 26, aided by the force from the disconnect spring 28, can push the wave generator 32 axially toward the solenoid 12 (upward in FIG. 1).

With respect to movement of the wave generator 32 axially away from the solenoid 12 (downward in FIG. 1), an external force can be applied to the wave generator 32 to cause such movement. By way of example only, a jack screw (not shown) can be manually placed against the wave generator 32 to apply such force.

Still referring specifically to FIG. 2, the actuator 10 includes also a flex spline 34 and ring gear 36 (namely, a primary ring gear 36a and secondary ring gears 36b). The flex spline 34 is configured to be operatively connected to and disconnected from the ring gear 36. A flexible outer bearing race 38 is disposed between the roller bearing 26 and flex spline 34. When the roller bearing 26 is not moving, the roller bearing 26 and ring gear 36 apply a force to the flex spline 34. Radial outward movement of the roller bearing 26 imparts force from the flex spline 34 and connects the flex spline 34 to the ring gear 36. The wave generator 32, flex spline 34, and ring gear 36 generate the load at the roller bearing 26.

In operation, it can be desired to freely or selectively disconnect the actuator 10 and then reconnect the disconnected actuator 10. Toward that end, FIGS. 3 through 5 show various stages in a process of the drive assembly 10 being disconnected.

Figure 3:
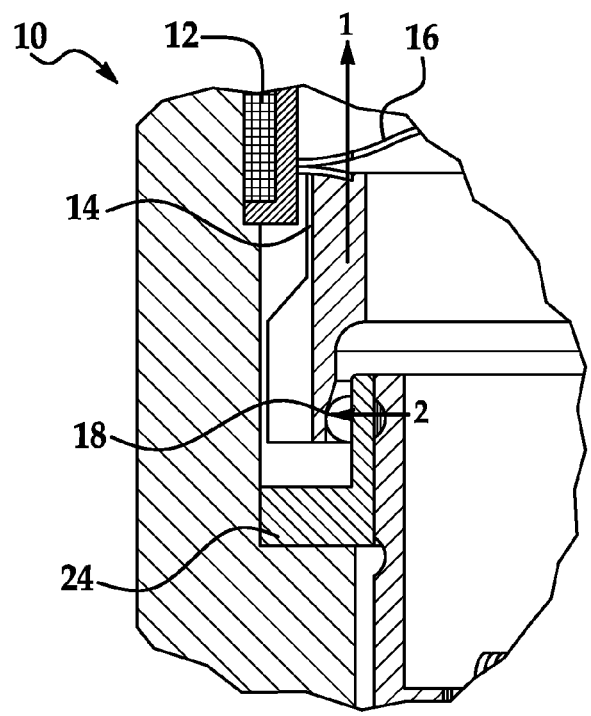
FIGS. 3-5 are respective detailed views of the non-limiting embodiment of the drive assembly of the rotary actuator with selective disconnect and reconnect according to the invention showing various stages in a process of the drive assembly being disconnected, FIG. 5 being a detailed view showing Section "D" illustrated in FIG. 6.

Referring specifically to FIG. 3, as indicated by arrow "1," on the "Disconnect" command, the solenoid 12 is activated, pulling the ball-lock sleeve 14 axially away from the harmonic drive and toward the solenoid 12 (upward in FIG. 1). As indicated by arrow "2," the ball-lock sleeve 14 retracts (i.e., moves toward the solenoid 12), and the ball bearings 18 move radially outward (to the left in FIG. 1) due to a substantially radial force imparted by angular contact of a ball-lock groove in the wave generator 32 reacting to axial forces created by the disconnect spring 28 and angular-bearing load on the wave generator 32.

Figure 4:
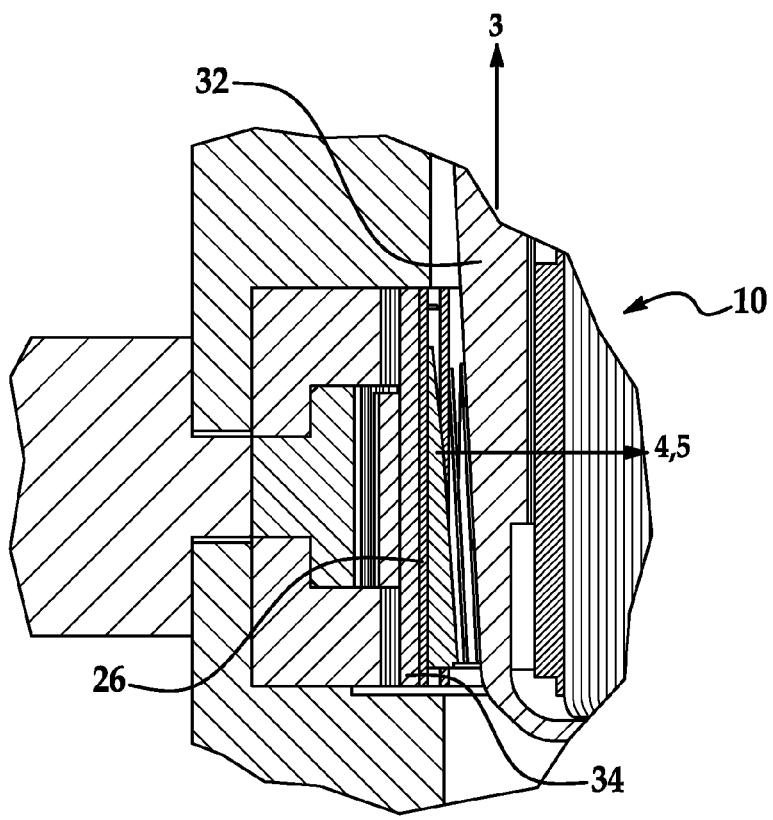

Referring specifically to FIG. 4, as indicated by arrow "3," axial load (i.e., the axial component of the load) generated by and at the roller bearing 26, aided by the force from the disconnect spring 28, pushes movement of the wave generator 32 axially toward the solenoid 12 (upward in FIG. 1). As indicated by arrow "4," the wave generator 32 is tapered and moves with respect to the taper such that the radial size of the wave generator 32 decreases as the wave generator 32 moves axially toward the solenoid 12. The roller bearing 26 is allowed to move radially inward due to force generated by the force of the flex spline 34 to return to an undeformed, circular state. (The axial length of the wave generator 32 is such that operative contact between the wave generator 32 and roller bearing 26 is always maintained.) As indicated by arrow "5," the roller bearing 26 moves radially inward (to the right in the figure), thus removing the force from the flex spline 34 and disconnecting the flex spline 34 from the ring gear 36. In the disconnect, the ball-lock groove in the wave generator 32 lines-up with the lock-ball-bearing retainer 24 and ball bearings 18.

Figure 5:
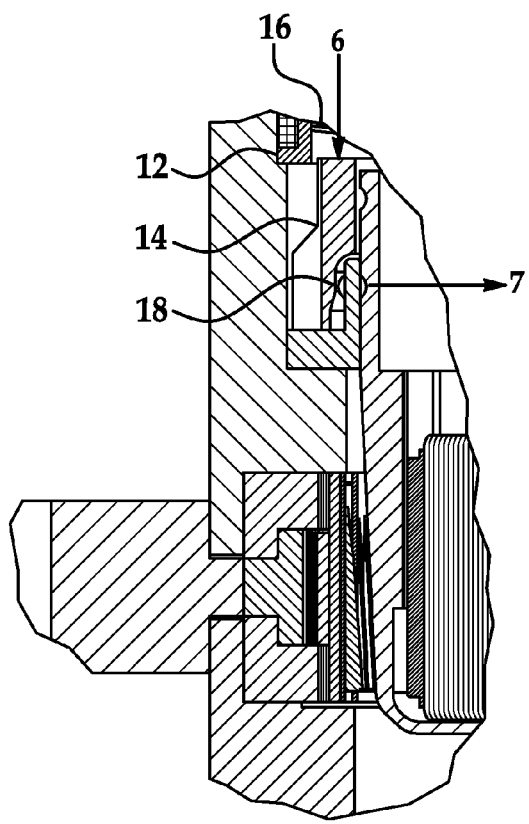
Figure 6:
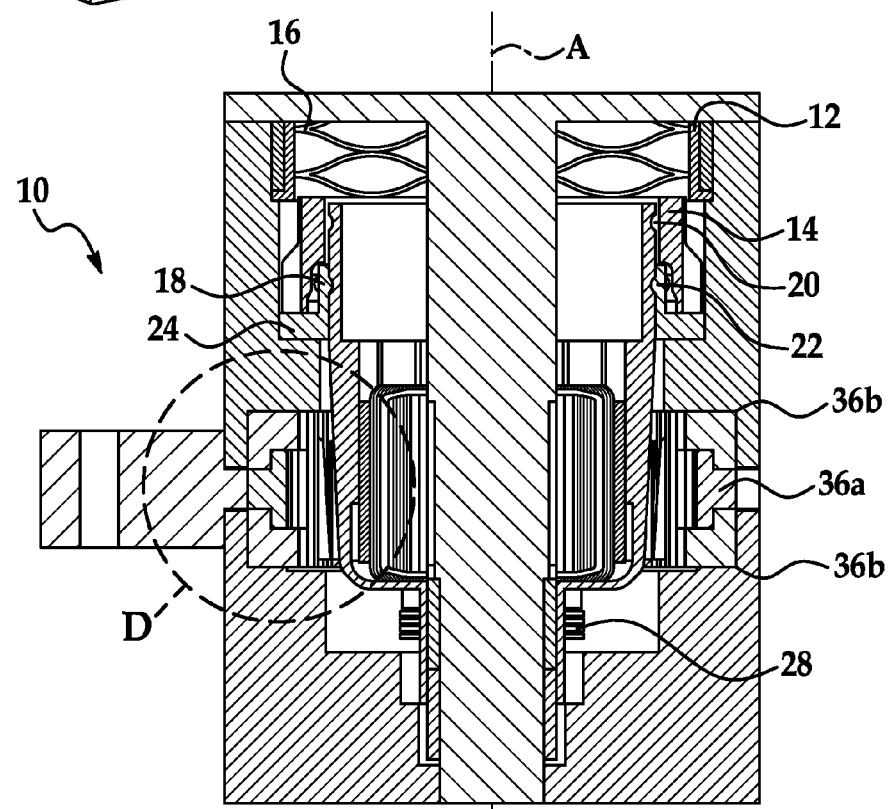
FIG. 6 is a sectional view of the non-limiting embodiment of the drive assembly of the rotary actuator with selective disconnect and reconnect according to the invention showing the drive assembly locked in a "disconnected" state.

Referring specifically to FIG. 5, as indicated by arrow "6," the solenoid 12 is then deactivated so that the ball-lock-sleeve-return spring 16 axially forces the ball-lock sleeve 14 to "return" and move axially toward the harmonic drive and away from the solenoid 12 (downward in FIG. 1). As indicated by arrow "7," the ball bearings 18 are forced to move radially inward (to the right in FIG. 1) into the secondary groove 22 (i.e., the "disconnect" lock groove 22 in the wave generator 32) in the "disconnect" position due to force created by the ball-lock sleeve 14. FIG. 6 shows the drive assembly 10 locked in a "disconnected" state, wherein the flex spline 34 is disconnected from the ring gear 36.

For the reconnect, on the "Connect" command, the solenoid 12 is activated, pulling the ball-lock sleeve 14 axially away from the harmonic drive and toward the solenoid 12 (upward in FIG. 1). As a result, the ball bearings 18 move radially outward (to the left in FIG. 1). As such, the axial component of the load generated at the roller bearing 26, aided by the force from the disconnect spring 28, pushes the wave generator 32 axially toward the solenoid 12 (upward in FIG. 1). The jack screw is placed against the wave generator 32, moving the wave generator 32 axially away from the solenoid 12. Consequently, the radial size of the wave generator 32 increases. In turn, the roller bearing 26 moves radially outward, thus imparting the force from the flex spline 34 and connecting the flex spline 34 to the ring gear 36. The solenoid 12 is then deactivated so that the ball-lock-sleeve-return spring 16 forces the ball-lock sleeve 14 axially toward the harmonic drive and away from the solenoid 12 (downward in FIG. 1). Thereafter, the ball bearings 18 are forced radially inward (to the right in FIG. 1) into the primary groove 20 in the "connect" position.

When the actuator 10 fails, the actuator 10 can be selectively disconnected and then reconnected. And, radial movement of the wave generator 32 with respect to the flex spline 34 renders such reconnect relatively easy.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A selectively disconnectable and reconnectable harmonic drive assembly comprising:
   a flex spline;
   a ring gear that is configured to be disconnected from and reconnected to the flex spline; and
   a harmonic wave generator that is configured to rotate about a rotational axis and move substantially radially with respect to the axis to allow the disconnect and reconnect;
   wherein the wave generator is configured to move substantially radially inward to allow the disconnect and radially outward to allow the reconnect.

2. The drive assembly of claim 1, wherein the wave generator is configured to move substantially radially inward to allow the disconnect while remaining within the flex spline.

3. The drive assembly of claim 1, wherein a plurality of roller bearings and disconnect spring are configured to push the wave generator substantially axially to allow the roller bearings to move substantially radially inward to release an outward force on the flex spline to disconnect the flex spline from the ring gear.

4. The drive assembly of claim 3, wherein the roller bearings and disconnect spring are configured to push the wave generator substantially axially when a solenoid is activated.

5. The drive assembly of claim 3, wherein a ball-lock sleeve is forced substantially axially and a plurality of ball bearings are forced substantially radially into a locked "disconnect" position.

6. The drive assembly of claim 5, wherein the ball-lock sleeve is forced substantially axially and the ball bearings are forced substantially radially into the locked "disconnect" position when a solenoid is deactivated.

7. The drive assembly of claim 5, wherein the ball-lock sleeve is forced substantially axially by a ball-lock-sleeve-return spring.

8. A rotary actuator comprising:
   a selectively disconnectable and reconnectable harmonic drive assembly including:
      a flex spline;
      a ring gear that is configured to be disconnected from and reconnected to the flex spline; and
      a harmonic wave generator that is configured to rotate about a rotational axis and move substantially radially with respect to the axis to allow the disconnect and reconnect;
      wherein the wave generator is configured to move substantially radially inward to allow the disconnect and radially outward to allow the reconnect.

9. The rotary actuator of claim 8, wherein the wave generator is configured to move substantially radially inward to allow the disconnect while remaining within the flex spline.

10. The rotary actuator of claim 8, wherein a plurality of roller bearings and disconnect spring are configured to push the wave generator substantially axially to allow the roller bearings to move substantially radially inward to release an outward force on the flex spline to disconnect the flex spline from the ring gear.

11. The rotary actuator of claim 10, wherein the roller bearings and disconnect spring are configured to push the wave generator substantially axially when a solenoid is activated.

12. The rotary actuator of claim 10, wherein a ball-lock sleeve is forced substantially axially and a plurality of ball bearings are forced substantially radially into a locked "disconnect" position.

13. The rotary actuator of claim 12, wherein the ball-lock sleeve is forced substantially axially and the ball bearings are forced substantially radially into the locked "disconnect" position when a solenoid is deactivated.

* * * * *